Figure 1:
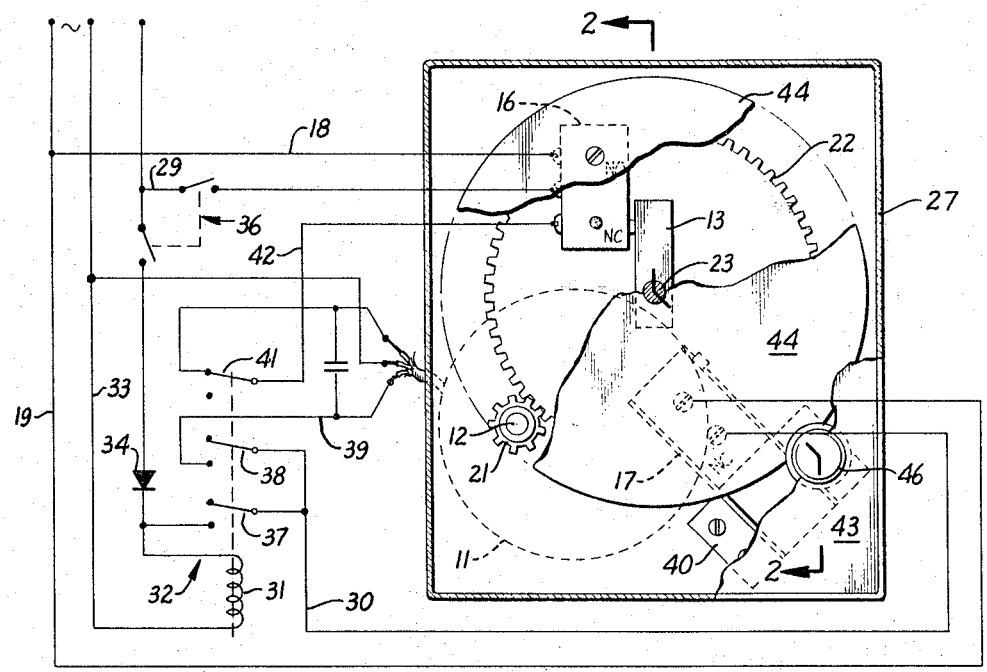

Dec. 20, 1966  D. TRAVAGLIO  3,293,385
CYCLE TIMERS
Filed Sept. 12, 1963  3 Sheets-Sheet 1

INVENTOR.
DALNY TRAVAGLIO
BY
Schapp & Hatch
ATTORNEYS

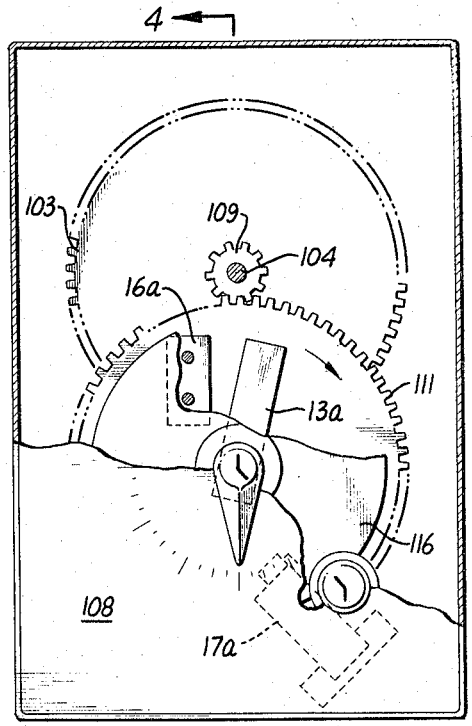
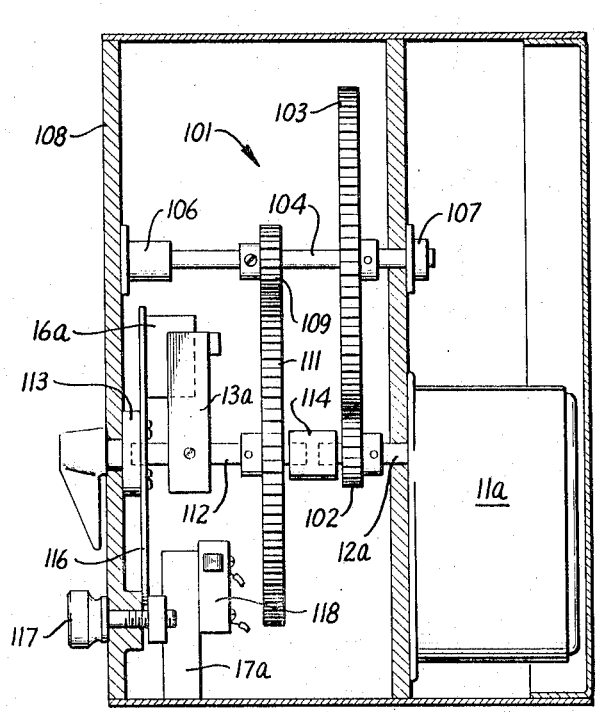

Dec. 20, 1966    D. TRAVAGLIO    3,293,385
CYCLE TIMERS
Filed Sept. 12, 1963    3 Sheets-Sheet 3

INVENTOR.
DALNY TRAVAGLIO
BY Schapp & Hatch
ATTORNEYS

United States Patent Office 3,293,385
Patented Dec. 20, 1966

3,293,385
CYCLE TIMERS
Dalny Travaglio, Kensington, Calif., assignor, by mesne assignments, to Warner-Lambert Pharmaceutical Company, Morris Plains, N.J.
Filed Sept. 12, 1963, Ser. No. 308,512
2 Claims. (Cl. 200—38)

This invention relates to cycle timers, and more particularly to devices for timing the operative cycle of equipment performing multiple repetitive functions involving cycling periods of equal duration.

Many kinds of apparatus are designed to carry out procedures in such manner that the results are uniform in character. This is particularly true of apparatus for performing biochemical analysis on large numbers of individual samples, such as the apparatus disclosed in United States Patent No. 3,193,358, issuing from application Serial No. 207,124 for Automated Analytical Apparatus invented by Hans Baruch and assigned to the assignee of the present application. In such apparatus, the samples are advanced step by step through the equipment, and each step is of precisely the same duration so that the procedures experienced by the samples are uniform. A number of different cycle timers have been employed for this purpose including mechanical timers and electronically operated timers. All of the previous timers have certain disadvantages which are overcome by the cycle timer of the present invention.

Electronic timers provide remarkably precise control over the duration of each cycle but are relatively expensive to build and maintain. Mechanical timers, on the other hand, are much less expensive but are not completely adaptable for use as cycle timers. Mechanical timers are relatively inaccurate when dealing with cycle periods involving fractions of a second and, where broad adjustment of the duration of the cycle is required, provision must be made for the time it takes the mechanical timer to reset itself to the starting point.

The present invention contemplates a cycle timer which utilizes the precise phasing of conventional, widely available alternating current to achieve very good consistency in an essentially mechanical device. Thus, the present cycle timer combines the desirable accuracy of electronic timers with the simple, sturdy and inexpensive qualities of the mechanical timer.

Accordingly it is a principal object of the present invention to provide a cycle timer adapted to control machinery performing similar repetitive functions in discrete cycles which is consistently accurate and yet is constructed in such a manner as to be relatively inexpensive as compared to timing devices of similar accuracy.

Another object of the present invention is to provide a cycle timer of the character described which is adjustable over a wide range of cycle periods and which provides consecutive uninterrupted cycling completely eliminating time intervals otherwise necessary for resetting the device to the beginning of the timing cycle.

A further object of the present invention is to provide a cycle timer of the character described which is adapted to utilize the precise phasing of conventional 60-cycle, or other, alternating current to achieve relatively precise timing in a simple mechanical device.

Another object of the invention is to provide a cycle timer which is simple, sturdy and has a long, service-free operating life.

Yet another object of the invention is to provide a two-way cycle timer which is mechanically reversed and which at the same time is infinitely adjustable over a wide range of cycling periods.

Further objects and advantages of the invention will be apparent as the specification progresses, and the new and useful features of the cycle timer will be fully defined in the claims attached hereto.

Figure 2:
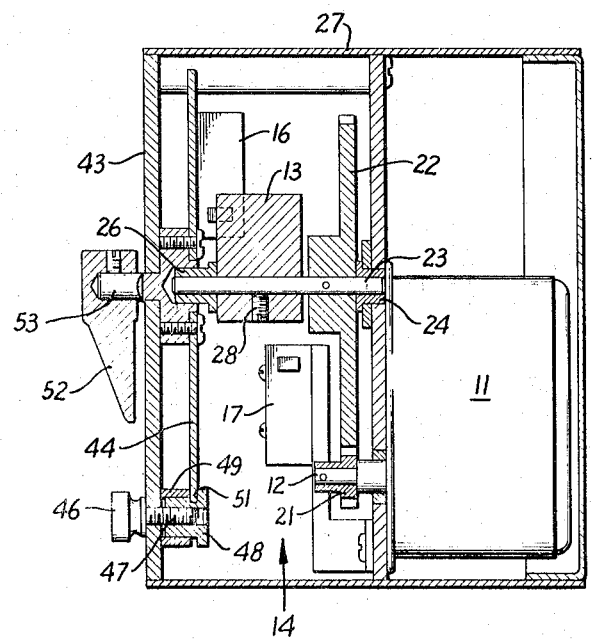
Figure 5:
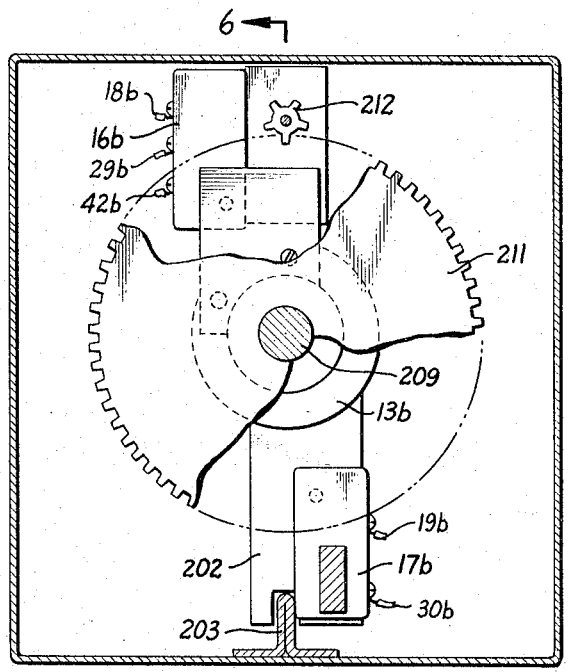

The preferred form of the invention is illustrated in the accompanying drawing forming part of this application, in which:

FIGURE 1 is a front elevational view of a cycle timer and associated electrical circuitry constructed in accordance with the present invention, portions being broken away and shown in section for clarity of illustration;

FIGURE 2, a sectional view taken substantially on the plane of line 2—2 of FIGURE 1;

FIGURE 3, a front elevational view of a modified form of the cycle timer of the present invention;

FIGURE 4, a sectional view taken substantially on the plane of line 4—4 of FIGURE 3;

FIGURE 5, a front elevational view of a third form of the invention; and

Figure 6:
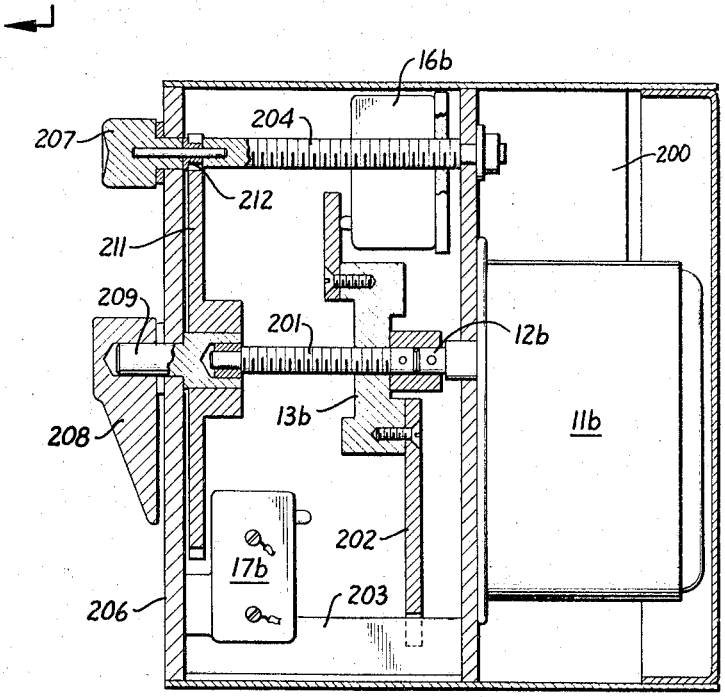

FIGURE 6, a sectional view taken substantially on line 6—6 of FIGURE 5.

While only the preferred forms of the invention are shown, it should be understood that various changes or modifications may be made within the scope of the claims attached hereto without departing from the spirit of the invention.

Referring to the drawing in detail, it will be seen that the cycle timer of the present invention consists basically of reversible motor means 11 having an outlet shaft 12 formed to rotate in either direction at a constant angular velocity, together with a member 13 having an operative connection to the shaft 12 for movement in first and second directions to predetermined positions, upon rotation of the shaft 12 in opposite directions, and control means 14 responsive to movement of member 13 and formed for reversing the direction of rotation of the motor means 11 when the member 13 reaches such predetermined positions, the control means 14 being formed for selectively adjusting the spacing between the predetermined positions so as to vary the duration of time required for the member to move therebetween.

In accordance with the present invention, the motor means 11 is formed to rotate in either direction at a constant angular velocity. For this purpose, an electric motor of the type known as "synchronous" is highly effective. Such motors possess the inherent characteristic of continuously operating at a constant speed in either direction once rotation is started. The synchronous motor operates on alternating current and the speed of the rotor is determined by the number of cycles per second. In the United States of America most electrical power is supplied to the user in the form of 60-cycle alternating current. However, it should be observed that any number of cycles per second may be used so long as they are timed with sufficient precision. Ordinarily, the number of cycles per second is very precisely determined by apparatus installed at the power house. In a sense, the cycle timer of the present invention utilizes this precise timing to accomplish its own timing function.

In the form of the invention illustrated in FIGURES 1 and 2 of the drawings, the synchronous motor 11 is of the self-reversing type, that is, the motor is capable of reversing its direction of rotation in response to an electrical signal. A suitable motor for this purpose is the DA series motor manufactured by Hurst Manufacturing Corp., Princeton, Indiana.

Preferably, and as here shown, the control means 14 includes spaced elements 16 and 17 which are responsive to the arrival of member 13 at predetermined positions in its path of travel for reversing the direction of rotation of the motor means 11. The elements 16 and 17 are relatively movable for selectively adjusting the spacing therebetween. Because member 13 is driven by the constant speed motor means 11, it moves at a constant velocity and hence varying the spacing between the elements 16–17 will serve to vary the duration of time required for the member to move between the aforesaid predetermined positions.

As illustrated in FIGURE 1 of the drawing, the elements 16 and 17 comprise snap-acting microswitches which are connected by leads 18 and 19 to the hot side of an alternating current supply circuit (not shown). In this version of the invention, the member 13 consists of an arm operatively connected to the output shaft 12 of the reversible synchronous motor 11, this connection here being through a gear train consisting of pinion gear 21, on shaft 12, which is meshed with spur gear 22 secured to shaft 23 journaled in bearings 24 and 26 carried by housing 27, arm 13 being secured to shaft 23 by set screw 28.

The parts are illustrated in their "home" position prior to the timing cycle. In this position, arm 13 has actuated the microswitch to connect lead 18 to a cycle pulse lead 29 adapted for connection to the piece of apparatus with which the timer is to be used.

The coil 31 of a three-pole double throw relay 32 is connected between cycle pulse lead 29 and the neutral lead 33 of the alternating current source. A diode 34 and a double-pole, single throw switch 36 are interposed between lead 29 and relay coil 31. Closing of switch 36 energizes relay coil 31 causing the relay to move from the de-energized open condition, illustrated in the drawing, to closed condition.

When relay coil 31 is energized, contact set 37 is closed, supplying current from microswitch 17 through lead 30 to coil 31 for locking the relay in energized position. At the same time contact set 38 closes, supplying current from lead 19 through microswitch 17 to lead 39 which supplies power to the windings of the synchronous motor 11 to drive it in a counter-clockwise direction as viewed in the drawing. This causes arm 13 to swing in a clockwise direction from the home position illustrated until it opens microswitch 17. This de-energizes relay coil 31 causing contact sets 37 and 38 to open and contact set 41 to close.

As arm 13 moves away from microswitch 16, the latter snaps to its normally closed position supplying current through lead 42 to contact set 41 being held open by the energized relay coil 31. When the latter is de-energized contact set 41 then supplies current to the windings of the synchronous motor 11 to drive it in the reverse clockwise direction. Thus, dropping out of the relay causes the motor 11 to reverse instantly and swing the arm 13 back toward the "home" position. When the arm 13 reaches the "home" position it again snaps microswitch 16 to connect lead 18 to lead 29 and disconnect it from lead 42. At this point, if switch 36 is closed, microswitch 16 will furnish a timing pulse to lead 29 and will also energize relay coil 31 to re-initiate the cycle.

As previously stated, the duration of the cycle may be timed precisely merely by varying the spacing between microswitches 16 and 17. As shown in FIGURES 1 and 2 this is accomplished by fixedly mounting microswitch 17 on a bracket 40 secured to the housing 43 of the timer and by mounting microswitch 16 on a disk 44 journaled for rotation around the axis of shaft 23. A thumbscrew 46 is mounted through the face of the housing and has its shank 47 threadably engaged with a nut 48. Rotation of the thumbscrew clamps the edge of disk 44 between a spacer 49 and a shoulder 51 on nut 48 so as to hold microswitch 16 at the desired angular deflection relative to microswitch 17. An indicator knob 52, secured to a stub shaft 53 extending from disk 44 through the housing, is used to aid in effecting the desired spacing.

A version of the invention in which reversing the direction of rotation of the synchronous motor is accomplished by purely mechanical means is illustrated in FIGURES 3 and 4 of the drawings. As there shown, the synchronous motor 11a has its output shaft 12a connect through a gear train 101 to the arm 13a. The elements 16a and 17a are here provided in the form of solid stops interposed in the path of movement of the arm 13a.

As a feature of the invention, it has been found that the action of the arm 13a in striking the stops 16a and 17a results in a rebound or inertial pulse transmitted back through the gear train 101 to the shaft 12a of the synchronous motor 11a. This pulse is sufficient to reverse the direction of rotation of the rotor of the motor 11a, thus reversing the direction of rotation of the motor without requiring electrical switching means or associated circuitry. As here shown, a pinion gear 102 is secured to shaft 12a and is intermeshed with a spur gear 103 secured to and carried on a shaft 104 mounted in parallel spaced relation to the shaft 12a. The shaft 104 is journaled for rotation in bearings 106 and 107 secured to the housing 108 of the timing device. A second spur gear 109 is secured to shaft 104 for rotation therewith and is in mesh with a spur gear 111 secured to a shaft 112 journaled in co-axial relation to shaft 12a in suitable bearings 113 and 114.

Adjustment of the spacing between stops 16a and 17a is accomplished in a manner similar to that employed in connection with the form of the invention illustrated in FIGURES 1 and 2 of the drawings. Stop 16a is secured to a disk 116 which is journaled for rotation around the axis of shaft 112. Stop 17a is fixedly secured directly to the housing 108. A thumbscrew assembly 117, similar to the thumbscrew assembly illustrated in FIGURE 2 of the drawings, is positioned for gripping engagement with the edge of disk 116 for holding the stop 16a in the desired position.

If desired, provision for a cycle pulse may be made by mounting a microswitch 118 on one of the stops, such as stop 17a, in position to be actuated by arm 13a as it contacts and rebounds from the stop.

A modified version of the electrically reversing cycle timer is illustrated in FIGURES 5 and 6 of the drawings. In this version the output shaft 12b of the synchronous motor 11b is connected directly to a threaded shaft 201 and the actuating member 13b is threaded on shaft 201 for movement along the shaft at a constant linear velocity in opposite directions in accordance with the direction of rotation of the synchronous motor 11b.

The control elements 16b and 17b are provided in the form of microswitches positioned in the path of movement of the member 13b. An extension 202 of member 13b has its distal end slidably engaged with the guideway 203 so that rotation of shaft 201 will cause the member 13b to advance or recede along the shaft in accordance with the direction of rotation.

The circuitry associated with the form of the invention shown in FIGURES 5 and 6 of the drawings is preferably similar to that shown in FIGURE 1. Thus, microswitches 16b and 17b are provided with leads 18b, 19b, 29b, 30b and 42b corresponding respectively to leads 18, 19, 29, 30 and 42 of FIGURE 1. The relay circuits are conveniently housed in enclosure 200.

Adjustment of the relative spacing between the microswitches 16b and 17b is here provided by securing microswitch 17b directly to the housing and by threadably connecting microswitch 16b to a threaded shaft 204 journaled in the timer housing 206 in parallel spaced relation to the threaded shaft 201. A knob 207 is secured to the end of shaft 204 and projects through the housing for manual rotation of shaft 204 so as to move microswitch 16b therealong. Indication of the relative position of microswitch 16b is provided by a pointer knob 208 secured to a stub shaft 209 projecting through the housing face from the hub of a spur gear 211 which is enmeshed with a pinion gear 212 secured to the threaded shaft 204. Thus, rotation of shaft 204 will be reflected by proportional rotation of the pointer knob 208, and, because of the gear ratios involved, very precise adjustment of the positioning of microswitch 16b may be effected.

In view of the foregoing it will be seen that the cycle timer of the present invention affords a high degree of precision in timing repetitive cycles and at the same time is of simple and sturdy construction affording a long and trouble-free service life.

What is claimed is:

1. A cycle timer, comprising an output shaft mounted for rotation, a reversible synchronous electric motor drivingly connected to said shaft, an arm fixedly connected to said shaft for swinging movement therewith in first and second directions of rotation between two predetermined positions upon rotation of said shaft in opposite directions, and control means for reversing said motor rotation, said control means including spaced first and second snap-acting switch means mounted in the path of movement of said arm and responsive to said arm contacting said switch means for reversing the direction of rotation of said motor, said switch means being adjustably mounted for selective adjustment of the spacing therebetween so as to vary the duration of time required for said arm to move therebetween.

2. A cycle timer, comprising a housing, a synchronous electric motor carried by said housing, said motor being adapted for reversing its direction of rotation in response to an electrical signal, a threaded shaft connected to said motor for rotation thereby, a follower member threadably engaged with said shaft, holding means for holding the follower against rotation whereby the follower moves axially along the shaft at constant linear velocity in a direction determined by the direction of rotation of said shaft, a pair of microswitches mounted in said housing in position to intercept and be actuated by said follower member, said microswitches being operative to provide an electrical signal to said synchronous electric motor for reversing the direction of rotation of the latter when either of said microswitches is actuated, one of said microswitches being fixedly mounted wtih respect to the motor and shaft and the other of said microswitches being adjustably mounted by an adjustable mounting means for adjusting the relative positions of said microswitches so as to vary the duration of time required for said member to move therebetween, said adjustable mounting means including a threaded rod mounted for rotation in said housing in parallel spaced relation to said threaded shaft and having a threaded connection with the other of said microswitches for advancing or retracting such microswitch axially with respect to the fixedly mounted microswitch, a pointer knob rotatably mounted on the outside of said housing, and a reduction gear train connection between the pointer knob and said threaded rod for indicating the relative position of the microswitch carried by the threaded rod and thereby indicating the time set for a cycle.

References Cited by the Examiner

UNITED STATES PATENTS

| | | | |
|---|---|---|---|
| 1,997,089 | 4/1935 | Sunberg | 200—38 |
| 2,269,973 | 1/1942 | Hathaway | 200—35 X |
| 2,566,824 | 9/1951 | Carlson | 200—47 |
| 2,614,187 | 10/1952 | Dorothea | 317—282 X |
| 2,946,902 | 7/1960 | Hagen | 200—35 X |
| 2,951,920 | 9/1960 | Miller | 200—47 |

BERNARD A. GILHEANY, *Primary Examiner.*

ROBERT K. SCHAEFER, *Examiner.*

H. M. FLECK, *Assistant Examiner.*